US006791066B2

(12) United States Patent
Hawk

(10) Patent No.: US 6,791,066 B2
(45) Date of Patent: Sep. 14, 2004

(54) ELIMINATING HOT SPOTS AT END PORTIONS OF BUS BARS OF A HEATABLE TRANSPARENCY HAVING AN ELECTRICALLY CONDUCTIVE MEMBER

(75) Inventor: Allen R. Hawk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 95 days.

(21) Appl. No.: 10/201,864

(22) Filed: Jul. 24, 2002

(65) Prior Publication Data

US 2004/0016739 A1 Jan. 29, 2004

(51) Int. Cl.[7] .................................................. B60L 1/02

(52) U.S. Cl. ....................... 219/203; 219/522; 219/520; 219/219; 338/307; 338/308; 338/314

(58) Field of Search ................................ 219/203, 522, 219/547, 543, 201, 202, 520, 219; 338/306–314

(56) References Cited

U.S. PATENT DOCUMENTS

| | | | | |
|---|---|---|---|---|
| 3,623,906 A | | 11/1971 | Akeyoshi et al. | 117/211 |
| 3,629,554 A | | 12/1971 | Stewart | 219/522 |
| 3,789,191 A | | 1/1974 | Spindler | 338/24 |
| 3,789,192 A | | 1/1974 | Spindler | 219/522 |
| 3,790,752 A | | 2/1974 | Boaz et al. | 219/522 |
| 3,794,809 A | | 2/1974 | Beck et al. | 219/203 |
| 3,928,748 A | | 12/1975 | Sauer | 210/522 |
| 4,401,609 A | | 8/1983 | McGarry et al. | 264/11 |
| 4,543,466 A | | 9/1985 | Ramus | 219/203 |
| 4,587,769 A | | 5/1986 | Cathers | 51/165.87 |
| 4,654,067 A | | 3/1987 | Ramus et al. | 65/60.5 |
| 4,718,932 A | | 1/1988 | Pharms | 65/42 |
| 4,725,710 A | | 2/1988 | Ramus et al. | 219/203 |
| 4,820,902 A | * | 4/1989 | Gillery | 219/203 |
| 5,030,592 A | | 7/1991 | Komarneni et al. | 501/9 |
| 5,040,411 A | | 8/1991 | Medzius | 73/73 |
| 5,066,111 A | | 11/1991 | Singleton et al. | 359/275 |
| 5,128,513 A | | 7/1992 | Byars et al. | 219/203 |
| 5,182,431 A | * | 1/1993 | Koontz et al. | 219/203 |
| 5,213,828 A | | 5/1993 | Winter et al. | 428/46 |
| 5,240,886 A | | 8/1993 | Gulotta et al. | 501/70 |
| 5,418,025 A | | 5/1995 | Harmand et al. | 428/38 |
| 5,466,911 A | | 11/1995 | Spagnoli et al. | 219/203 |
| 5,492,750 A | | 2/1996 | Shumaker, Jr. et al. | 428/192 |
| 5,523,162 A | | 6/1996 | Franz et al. | 428/421 |
| 5,593,929 A | | 1/1997 | Krumwiede et al. | 501/70 |
| 5,824,994 A | | 10/1998 | Noda et al. | 219/203 |
| 5,850,070 A | | 12/1998 | Gillner et al. | 219/203 |
| 6,027,766 A | | 2/2000 | Greenberg et al. | 427/226 |

FOREIGN PATENT DOCUMENTS

| | | |
|---|---|---|
| EP | 0 524 537 | 1/1993 |
| WO | 00/73062 | 12/2000 |
| WO | 00/76930 | 12/2000 |

OTHER PUBLICATIONS

U.S. patent application Ser. No. 09/738,306 filed Dec. 15, 2000.

U.S. patent application Ser. No. 09/591,572 filed Jun. 9, 2000.

International Search Report dated Dec. 16, 2003.

* cited by examiner

*Primary Examiner*—Shawntina Fuqua
(74) *Attorney, Agent, or Firm*—Andrew C. Siminerio

(57) ABSTRACT

A transparency, e.g. a laminated windshield has a pair of spaced bus bars on an electric conductive member e.g. an electric conductive coating on a glass sheet. The perimeter of the coating is spaced from the peripheral edge of the sheet to provide a non-conductive strip. Ends the bus bars extend into the non-conductive strip to minimize/eliminate hot spots at the end portions of the bus bars. An additional feature to reduce hot spots includes bus bars having different lengths with portions of the coating between the bus bars not extending beyond the ends of the longer bus bar. In another, the windshield has a vision area, a bus bar between the top edge of the coating and the top edge of the vision area and a bus bar between the bottom edge of the coating and bottom edge of the vision area.

33 Claims, 2 Drawing Sheets

ELIMINATING HOT SPOTS AT END PORTIONS OF BUS BARS OF A HEATABLE TRANSPARENCY HAVING AN ELECTRICALLY CONDUCTIVE MEMBER

RELATED APPLICATION

The bus bar arrangement incorporating features of this invention is used in the practice of, and the practice of this invention uses the interlayer composite of, U.S. patent application Ser. No. 10/201,863 filed even date in the names of Bruce Bartrug, Allen R. Hawk, Robert N. Pinchok and James H. Schwartz for "Edge Sealing Of A Laminated Transparency" which application is hereby incorporated by reference.

BACKGROUND OF THE INVENTION

1. Field of the Invention

This invention relates to a heatable transparency, and more particularly, to arranging ends of bus bars relative to an electrically conductive member of a heatable automotive transparency e.g. a laminated windshield to minimize if not eliminate hot spots at the end portions of the bus bars.

2. Discussion of the Technology

Automotive heatable windshields, e.g. of the type disclosed in U.S. Pat. No. 4,820,902 include two glass sheets laminated together by a plastic interlayer, usually a sheet of polyvinyl butyral ("PVB"). A pair of spaced bus bars between the glass sheets is in electrical contact with an electrically conductive member, e.g. a sputtered electrically conductive coating of the type disclosed in European Patent Application No. 00939609.4 or a plurality of electrically conductive filaments of the type disclosed in U.S. Pat. No. 5,182,431. Each of the bus bars is electrically accessible by an external lead to pass current from a power source through the bus bars and electrically conductive member to heat the conductive member and thereafter heat the inner and outer surfaces of the windshield by conduction. The heated windshield surfaces attain a temperature sufficient to remove fog, and melt snow and ice. As can be appreciated, heatable windshields are practical, and in some geographical areas are a requirement, during the winter season.

The conductive member is usually on the no. 3 surface of the windshield, i.e. the outer surface of the inner glass sheet of the laminate, although laminated windshields have been made with the conductive coating on the no. 2 surface, i.e. the inner surface of the outer glass sheet. The bus bars may be provided by silk-screening a ceramic paste having metal particles onto the conductive coating, e.g. as discussed in U.S. Pat. Nos. 4,725,710 and 5,128,513, or by positioning a metal foil between the interlayer sheet and the conductive coating as discussed in U.S. Pat. Nos. 5,418,025; 5,466,911 and 5,850,070.

One limitation of the presently available heatable windshields is hot spots at the end portions of the bus bars. Depending on the severity of the hot spots, fractures in the glass sheets may occur. Under certain conditions, these fractures can propagate into the vision area of the windshield requiring windshield repair or replacement. To eliminate hot spots in bus bars or more evenly distribute the current along the bus bar, various techniques have been employed. More particularly, U.S. Pat. No. 5,128,513 discusses varying the width of the bus bars and extending one bus bar laterally beyond the corresponding end of the opposite bus bar.

Other types of available bus bar arrangements are discussed in U.S. Pat. Nos. 3,789,191; 3,789,192; 3,790,752; 3,794,809; 4,543,466; 5,182,431 and 5,213,828.

As can be appreciated, it would be advantages to provide a heatable transparency, e.g. a laminated automotive windshield that minimizes if not eliminates hot spots in bus bars and more particularly in the end portions of the bus bars.

SUMMARY OF THE INVENTION

One embodiment of the invention relates to an article having a member responsive to electric stimulation, e.g. a sputter electrically conductive coating or a coating that changes transmittance as a function of applied current. The article includes a substrate having a major surface and peripheral edges; the electrically conductive member is on the major surface of the substrate. The electrically conductive member, e.g. an electrically conductive coating is defined by a perimeter with the perimeter of the electrically conductive coating selectively spaced from the peripheral edges of the substrate to provide an electrically insulated area or non-conductive strip. A pair of spaced bus bars is in electrical contact with the coating. Each of the bus bars has a pair of opposite end portions with at least one of the end portions of one of the bus bars extending beyond the perimeter of the electrically conductive member into the non-conductive strip to minimize, if not eliminate, hot spots at the at the least one end portion. The article incorporating features of the invention may be used to make multiple glazed units, heatable vehicular transparencies and heatable windows for refrigerator doors, to name a few products that may be made using the article incorporating features of the invention.

In another embodiment of the invention, the article is a laminated article such as a laminated transparency, e.g. an automotive windshield having a pair of glass sheets laminated together by a plastic sheet or interlayer with the electrically conductive coating, e.g. a conductive film between a pair of dielectric films and the pair of bus bars between the glass sheets. Ends of the bus bars extend beyond the perimeter of the conductive coating into the non-conductive strip to minimize if not eliminate hot spots at the end portions of the bus bars and preferably terminate short of the peripheral edge of the glass sheet. A lead is connected to each of the bus bars and extends from its respective bus bar beyond the peripheral edge of the windshield to provide electrical access to the bus bars and the conductive coating.

Additional features of the invention to minimize, if not eliminate, hot spots at the end portions of bus bars include the following. A pair of bus bars having different lengths has one of the bus bar extending along the topside of the conductive coating and the other one of the bus bars extending along the bottom side of the conductive coating. The portions of the coating between the bus bars do not extend beyond the ends of the longer bus bar. In still a further feature of the invention, the windshield has a vision area having a top edge and a bottom edge. The "vision area" is defined as the see through area of the windshield available to the driver and/or passenger. The coating has a top edge beyond or adjacent the top edge of the vision area and a bottom edge below or adjacent the bottom edge of the vision area. The top bus bar is adjacent the top edge of the coating and the bottom bus bar is adjacent the bottom edge of the coating with the bus bars outside the vision area. The bottom edge of the coating is spaced a greater distance from the bottom edge of the vision area than the bottom bus bar, and the top edge of the coating is spaced a greater distance from the top edge of the vision area than the top bus bar.

In still a further embodiment of the invention, the bus bars and leads are contiguous with one another and are each a metal foil. The bus bars are adhered to the plastic interlayer of the windshield, and the leads extend beyond the edge of the windshield to provide external electric access to the bus bars. An air barrier arrangement of the type disclosed in U.S. patent application Ser. No. 10/201,863, filed even date is provided around the leads to prevent the ingress of air between the lead and the glass sheet having the conductive coating after edge sealing and during autoclaving.

The invention further relates to a method of making the laminate.

DETAILED DESCRIPTION OF THE INVENTION

Figure 1:
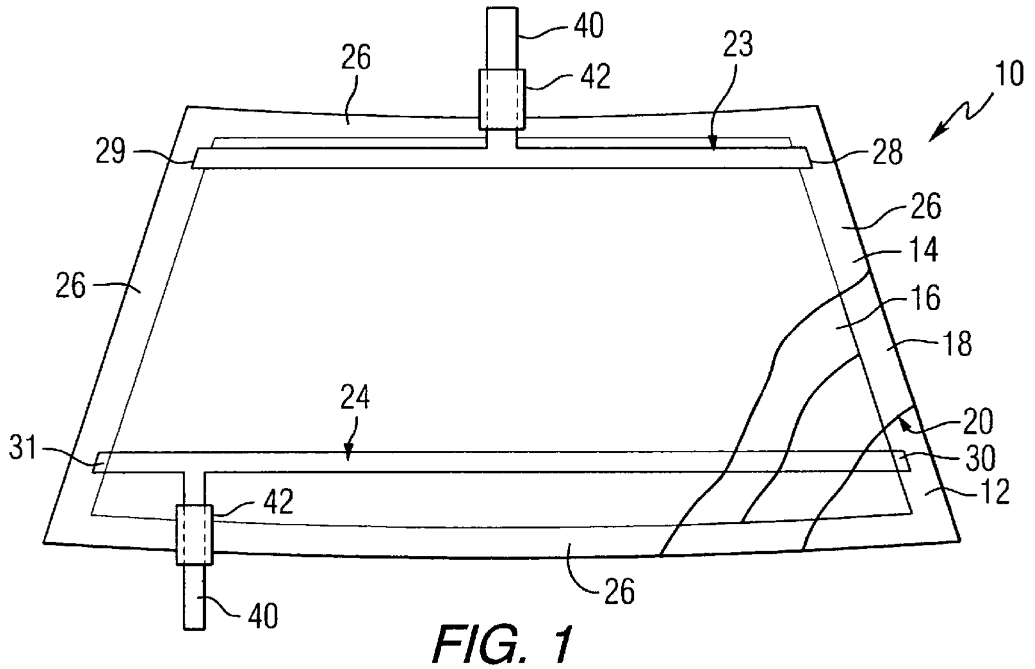
FIG. 1 is a plan view of an automotive laminated windshield incorporating features of the invention and having portions removed for purposes of clarity.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.3, and ending with a maximum value of 10 or less, e.g., 5.5 to 10. Also, as used herein, the terms "deposited over", "applied over", or "provided over" mean deposited, applied, or provided on but not necessarily in direct surface contact with. For example, a material "deposited over" a substrate does not preclude the presence of one or more other materials of the same or different composition located between the deposited material and the substrate.

In the following discussion, the invention will be described for use on vehicular transparency; however, as will be appreciated, the invention is not limited thereto, and may be practiced on any member responsive to stimuli. For example, but not limiting to the invention, the member may be an electric conductive member that generates heat as current moves through the member, or a thermo or electric sensitive coating that changes transmittance upon heating or application of current. Types of members that may be used in the practice of the invention but not limiting the invention thereto are discussed in U.S. Pat. Nos. 4,401,609; 5,040,411 and 5,066,111; U.S. patent application Ser. No. 09/738,306 filed Dec. 15, 2000, in the names of Chia Cheng Lin et al. for "Electrochromic Transparency Incorporating Security System", and U.S. patent application Ser. No. 09/591,572 filed Jun. 9, 2000, in the name of C. B. Greenberg for "Electrochromics", which documents are hereby incorporated by reference.

Further, the invention may be practiced on monolithic sheets and/or laminated sheets of the type used for vehicular transparencies, multiple glazed windows for residential home and commercial buildings, e.g. of the type disclosed in U.S. Pat. No. 3,629,554, and/or refrigerator doors having a viewing area. Still further, the invention may be practiced with the member on any type of electric insulating material that does not deteriorate at the temperatures attained by the conductive member. Types of materials that may be used in the practice of the invention include but are not limited to wood, plastic, any type of glass, e.g. soda-lime-silicate glass, borosilicate glass, pattern glass, clear glass and tinted glasses, refractory glasses and combinations thereof. For example and not limiting the invention thereto, the glass sheets may be of the type disclosed in U.S. Pat. Nos. 5,030,592; 5,240,886, and 5,593,929, which patents are hereby incorporated by reference. The glass sheets may be annealed, tempered or heat strengthened.

The vehicular transparency in the following discussion is an automotive windshield; however, the invention is not limited thereto and can be any type of a vehicular transparency such as, but not limiting the invention thereto, an automotive sidelight, e.g. of the type disclosed in European Patent Application No 00936375.5, which document is hereby incorporated by reference, a moon roof and a backlite or rear window. Further, the transparency can be for any type of vehicle such as but not limiting the invention thereto land vehicles such as but not limiting the invention thereto trucks, cars, motorcycles, and/or trains, to air and/or space vehicles, and to above and/or below water vehicles.

The invention will be discussed to fabricate a laminated windshield using the interlayer composite and the laminating techniques disclosed in U.S. patent application Ser. No. 10/201,863 filed even date in the names of Bruce Bartrug, Allen R. Hawk, Robert N. Pinchok and James H. Schwartz for "Edge Sealing Of A Laminated Transparency". As will be appreciated the invention is not limited thereto.

With reference to FIG. 1 there is shown an automotive windshield 10 incorporating features of the invention. The windshield 10 includes a pair of glass sheets or blanks 12 and 14, and an electric conductive member 16 on inner surface of one of the glass sheets, e.g. inner surface of the inner sheet 14 also referred to as the No. 3 surface of the laminated windshield. Sheet or layer 18 of an interlayer composite 20 of the type disclosed in U.S. patent application Ser. No. 10/201,863 filed even date laminates the glass sheets 12 and 14 together. A top bus bar 23 and a bottom bus bar 24 as viewed in FIG. 1 incorporating features of the invention are spaced from one another and between the glass sheet 14 and the interlayer sheet 18. Current is moved between the sheets 12 and 14 to the bus bars in a manner discussed below and through the conductive member 16 to heat the outer and the inner surfaces of the windshield 10 by conduction to remove fog, ice and/or snow, as the case may be. Although the invention is not limited thereto, the electric conductive member 16 is usually on or against the outer surface of the inner sheet (no. 3 surface of the laminated windshield) as the windshield is mounted in an automobile.

As will be appreciated by those skilled in the art, the invention is not limited to the type of conductive member 16 used in the practice of the invention. More particularly, the electric conductive member 16 may be a plurality of spaced conductive elements such as wires e.g. as discussed in U.S. Pat. No. 5,182,431; strips of conductive coating; a plurality of discreet spaced areas of conductive coating, or a continuous conductive coating of the type disclosed in U.S. Pat. No. 4,820,902 which patents are hereby incorporated by reference. In the practice of the invention and without limiting the invention thereto, the conductive member is a continuous coating having two metal films usually infrared reflecting films, e.g. silver separated by dielectric layers that can include a film of an oxide of a zinc tin alloy and optionally a zinc oxide film. The coating is of the type disclosed in European Patent Application No. 00939609.4, which application is hereby incorporated by reference.

Figure 2:
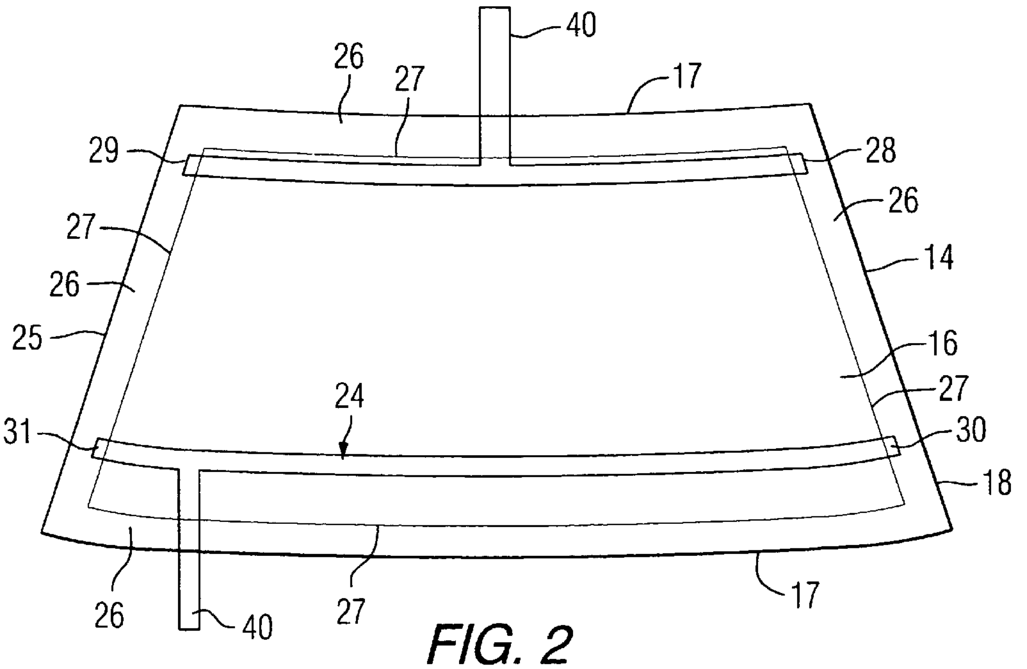
FIG. 2 is a plan view of a subarrangement of the windshield of FIG. 1 showing the relationship of the bus bars and the coating in accordance to the teachings of the invention.

For ease of discussion and an appreciation of the invention, FIG. 2 shows the relationship of the bus bars 23 and 24, the conductive coating 16, and the surface of the glass sheet 14 having the coating 16, with one another. The coating 16 terminates short of the peripheral edges or periphery of the glass sheet on which it is applied, e.g. short of peripheral edges 25 of the sheet 14 as shown in FIG. 2, to provide an uncoated area or non-conductive strip 26 between the perimeter 27 of the conductive coating 16 and the peripheral edge 25 of the sheet 14. This may be accomplished by coating the total surface of the sheet and deleting the coating e.g. as disclosed in U.S. Pat. No. 4,587,769 or using a mask during sputtering e.g. as disclosed in U.S. Pat. No. 5,492,750 to provide the uncoated strip 26. The disclosures of U.S. Pat. Nos. 4,587,769 and 5,492,750 are hereby incorporated by reference.

The perimeter 27 of the coating 16 is usually spaced from the edges 25 of the glass sheet 14 to provide the non-conductive strip 26 to attain an acceptable edge seal about the periphery of windshield 10 during the edge sealing and laminating process. However, as will be appreciated and in accordance to the teachings of the invention, having the non-conductive strip provides an area into which the end portions of the bus bar are extended.

The top bus bar 23, the bottom bus bar 24 and the uncoated strip 26 have a relationship that incorporates features of the invention to minimize, if not eliminate, hot spots at the end portions of the bus bars. "Hot spots" as the term is used herein, are areas of the bus bar that are at a temperature higher than the adjacent portions of the bus bar as a result of more current moving through the area than through the adjacent portions of the bus bar. Although not limiting to the invention, the parameters of interest in the preferred embodiment of the invention include: (1) the position of the ends of the bus bar relative to the perimeter of the conductive member, in this non-limiting embodiment the conductive coating 16, (2) the spacing between the bus bars and (3) the change in the horizontal distance between the sides of the conductive coating between the bus bars.

Regarding the position of the ends of the bus bar relative to the perimeter of the conductive coating, as shown in FIG. 2, end portions 28 and 29 of the top bus bar 23, and end portions 30 and 31 of the bottom bus bar 24 extend beyond the perimeter 27 of the conductive coating 16 into the non-conductive strip 26 with the ends of the bus bar preferably terminating short of the periphery 25 of the sheet 14.

Through observations of IR photographs, it has been concluded that with the ends of the bus bars terminating short of the perimeter of the conductive coating while maintaining the remaining parameters constant, hot spots are observed at the end portions of the bus bar. As the distance between the end of the bus bar and the perimeter increases, the hot spots increase in size and temperature and vice versa.

Extending the ends of the bus bars into the non-conductive strip 26 while keeping the remaining parameters constant reduces the temperature and/or area of the hot spots when compared to ends of the bus bars that terminate short of the perimeter of the coating. It is believed that the hot spots result from more current moving through the end portions of the bus bars to heat the surrounding area of the conductive member between the end portions of the bus bar and the perimeter of the coating. Based on the forgoing, it is expected that perfect alignment of the ends of the bus bar with the perimeter of the conductive coating while maintaining the other parameters constant, will reduce the current distribution at the end portions of the bus bars when compared to ends of the bus bar that terminate short of the perimeter of the coating.

Although it is expected that hot spots are minimized with perfect alignment of the ends of the bus bars with the perimeter of the conductive member, because of the difficulty in a production environment of continuously aligning the ends of the bus bars with the perimeter of the conductive coating, it is preferred in the practice of the invention to have the ends of the bus bars extend into the non-conductive strip 26. The length of the end portions 28, 29, 30 and 31 of the bus bars 23 and 24 extending into the non-conductive strip 26 is not limiting to the invention. As long as the ends of the bus bars extend beyond the perimeter of the coating, the temperature and area of the hot spots decrease as compared to hot spots at the end portions of the bus bars terminating short of the perimeter of the conductive member. In the practice of the invention, it is preferred to have the ends of the bus bars terminate short of the peripheral edge of the laminate to avoid shorting of the bus bar when the windshield is mounted in the opening of the automotive body.

Consider now the spacing between the bus bars 23 and 24. With continued reference to FIG. 2, the upper and lower edges 17 of the glass sheet 14 and of the windshield 10 shown in FIG. 1 usually have a radius. The upper edge of the blanks or sheets 12 and 14 has a smaller radius and length than the bottom edge of the sheets 12 and 14, which is the normal configuration of sheets used in the fabrication of windshields. The perimeter configuration of the conductive member usually has the same or similar peripheral configuration as the sheet to heat the vision area of the windshield. With the top bus bar 23 generally following the shape of the top edge of the conducive coating, and the bottom bus bar 24 following the shape of the bottom edge of the conductive member as viewed in FIG. 2, the length of the bottom bus bar 24 is greater than the length of the top bus bar 23. As the difference in length between the bus bars increases, the area of conductive coating to be heated by the bottom bus bar increases. The result of this difference is the end portions of the bottom bus bar carrying more current to heat more area of the conductive member 16, which contributes to increasing the temperature at the end portions of the bottom bus bar.

One solution to the problem is to provide a conductive member with a rectangular shape. However, since the windshield does not have a rectangular shape, a significantly large portion at the bottom of the windshield (where the snow and ice usually accumulate) would not be heated. In the practice of the invention, the solution to this problem is to reduce the space between the bus bars. For example and not limiting to the invention, the bus bar 23 is spaced from the top edge of the conductive member 16, and the bottom bus bar 24 is spaced from the bottom edge of the conductive member to decrease the area of the conductive member between the bus bars. In this manner the area to be heated by the bottom bus bar is reduced. The invention is not limited to the distance between the bus bar and the adjacent side of the conductive member; however in the practice of the invention it is preferred to keep the bus bars out of the vision area of the windshield.

Consider now the change in the distance between the vertical sides or edges of the conductive coating 16 between the bus bars 23 and 24. In the practice of the invention, it is preferred that no portion of the vertical edges of the conductive coating 16 as viewed in FIG. 2 between the bus bars extend beyond one or both ends of the longer bus bar. As viewed in FIG. 2, no portion of the coating 16 between the bus bars extends beyond the bottom bus bar 24, the longer of the two bus bars. Although not limiting to the invention, the distance between the vertical edges of the conductive coating increases as the distance from the bottom bus bar decreases. Portions of the conductive coating between the bus bars that extend beyond the end of the longer bus bar will result in the bus bar having to heat more area of the conductive coating.

As can be appreciate, the invention is not limited to the material of the bus bars. For example, but not limiting to the invention, the bus bars may be a silk-screened ceramic metal paste applied to the coating 16 or an elongated piece of metal, e.g. a metal fabric. Preferably the bus bars are made of a metal foil, e.g. gold, silver, aluminum, or copper to name a few metal foils that can be used. In the practice of the invention, a copper foil was used because unlike gold foil and silver foil, it is inexpensive and unlike aluminum foil, it is non-reactive with most other current conducting materials. The width and thickness of the copper foil is not limiting to the invention; however it should be of sufficient thickness and width to carry the current to heat the conductive coating 16 to heat the outer surfaces of the windshield. The voltage and current usually carried by the bus bars to heat an automotive windshield is about 42 volts and about 31 amperes.

In one nonlimiting embodiment, the thickness of the copper foil of the bus bars used in the practice of the invention was 2.8 mils (0.07 millimeters (mm)). The width of the copper foil of the bus bar 23 having an electrical power feed located at the center of the bus bar was 0.28 inch (7 mm), and the width of the copper foil of the bus bar 24 having an electrical power feed located at the side of the bus bar was 0.56 inch (14 mm). A wider bus bar is preferred when using a side feed instead of a center feed to provide for an even current flow along the extended path of the bus bar. More particularly, the current moving through the right portion of the metal foil of the bus bar 24 as viewed in FIGS. 1 and 2 has to travel a longer distance and has more surface of the conductive coating to pass current than the length of the bus bar 23 on each side of its respective lead. Therefore, the bus bar 24 should have a greater cross sectional area than the bus bar 23. Because bus bars of different thickness may cause laminating concerns, it is preferred, although not limiting to the invention, to have bus bars of uniform thickness and increase the width of the bus bar to increase its cross sectional area. The length of the bus bars is not limiting to the invention; however the length should be sufficient to extend into the non-conductive strip 26 and as discussed above, preferably terminating short of the periphery of the sheet 14. Although not limiting to the invention, in the practice of the invention, the lead 40 was contiguous with its respective bus bar, i.e. an extension of the copper foil. As can be appreciated, the lead can be a filament, wire, or separate pieces of foil not contiguous with its respective the bus bar.

As can be appreciated, the exit location of the leads 40 from the laminate is not limiting to the invention. For example, both leads 40 may exit from the same side of the windshield as disclosed in U.S. Pat. No. 5,213,828 which disclosure is hereby incorporated by reference. The leads may exit from opposite sides as shown in FIGS. 1 and 2, or the leads may each exit from the same location on their respective side of the windshield, or from different locations on their respective side of the windshield as shown in FIGS. 1 and 2.

In the practice of the invention, a sputtered infrared reflecting coating was deposited onto the surface of a flat glass piece. A mask, e.g. of the type discussed in U.S. Pat. No. 5,492,750, was positioned on a glass piece to provide an uncoated marginal edge portion, the non-conductive strip 26, after the sheet was cut from the piece. The coated sheet had the coating terminating 16 millimeters from the peripheral edge of the sheet to provide the uncoated area 26 shown in FIG. 1. The coating had a generally trapezoidal shape with the greater length at the bottom of the sheet 14 as shown in FIG. 1. The width of the coating generally increased moving from the top edge to the bottom edge as shown in FIG. 1. Since the process of sputtering and the sputtered coating is not limiting to the invention and are well known in the art, the sputtering process and coating will not be discussed.

The coated sheet 14 was positioned over another glass sheet 12 having a black band (not shown) of ceramic paste silk screened on the marginal edge of the sheet 12 to provide UV protection for the underlying adhesive securing the windshield in position in the automotive body. The sheet 14 having the conductive coating 16 and the sheet 12 having the black band on the marginal edge were shaped and annealed. Since the process of shaping and annealing of blanks for automotive windshields is well known in the art and is not limiting to the invention, the processes will not be discussed.

Figure 3:
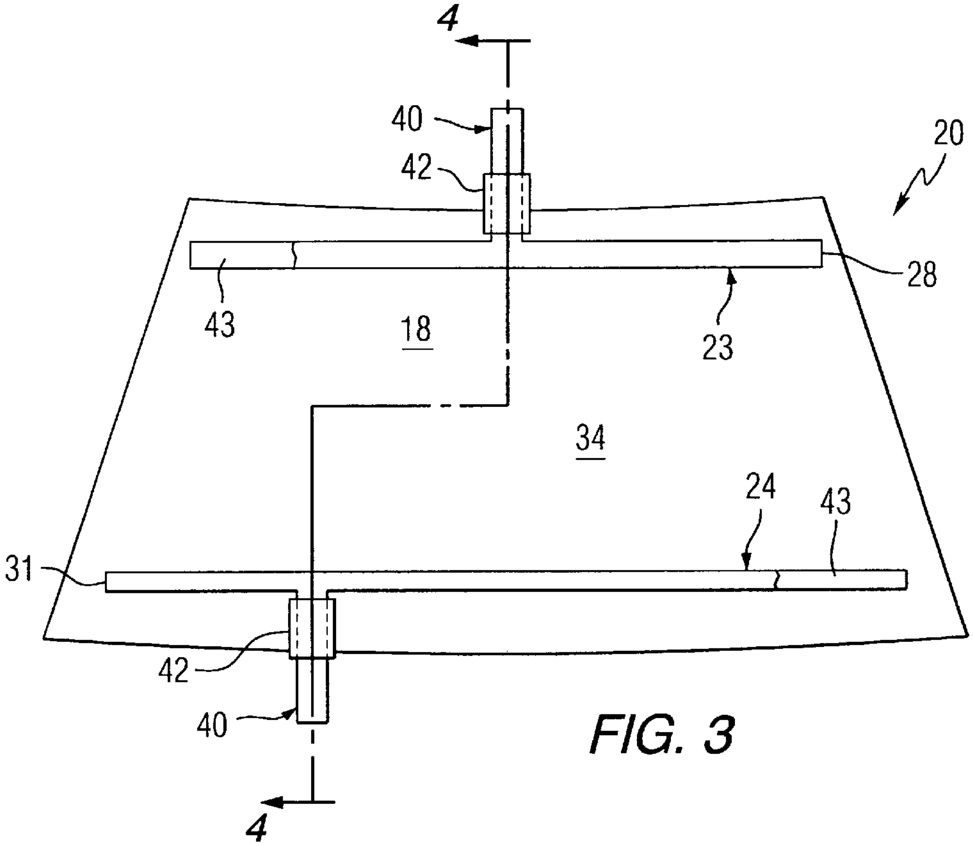
FIG. 3 is a plan view of an interlayer composite, having portions removed for purposes of clarity, that may be used in the practice of the invention.
Figure 4:
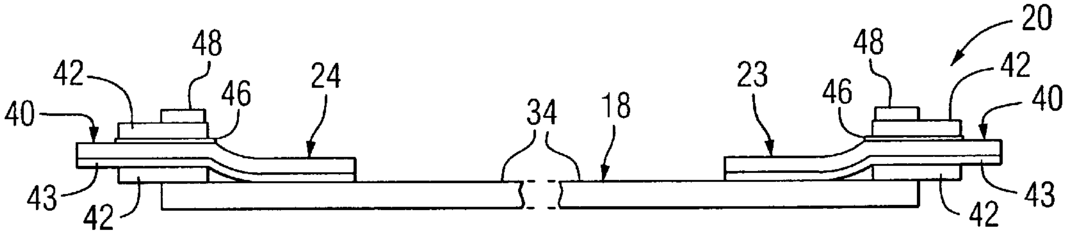
FIG. 4 is a view taken along sectional lines 4—4 of FIG. 3.
Figure 5:
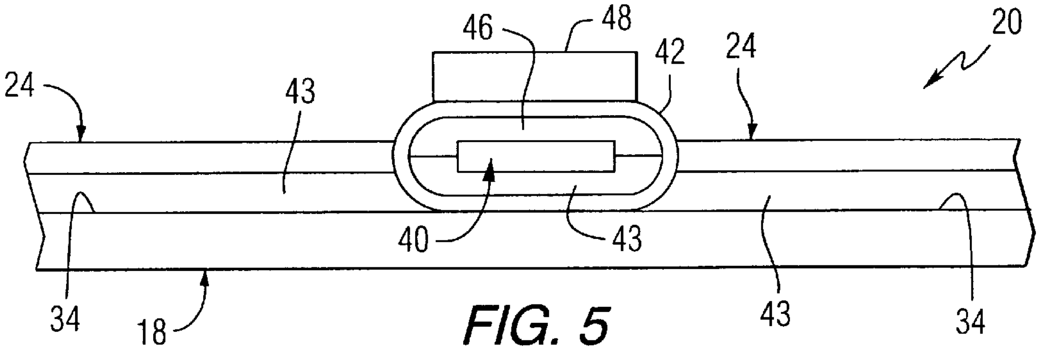
FIG. 5 is a side elevated view of the lead assembly shown in FIG. 3 that may be used in the practice of the invention.

With reference to FIGS. 3 and 4, an interlayer composite 20 of the type disclosed in U.S. patent application Ser. No. 10/201,863, filed even date, was used to laminate the glass sheets and bus bars together; however, as will be appreciated, the invention is not limited thereto. The interlayer composite 20 had a PVB sheet 18 having a thickness of 30 mils (0.76 mm) and a surface area and configuration to overlay and cover the surface of sheet 14. The bus bars had a length sufficient to extend across the conductive coating 16, with a length of 0.25 inch (6 mm) of each end portion of the bus bars extending into the non-conductive strip 26 of the sheet 14. The top bus bar 23 and its respective lead 40 were contiguous and had a thickness of 2.8 mils (0.07 mm). The top bus bar was 0.28 inch (7 mm) wide and its respective lead was 0.56 inch (14 mm) wide; the lead extended from about the center portion of the bus bar 23 as shown in FIGS. 1 and 2. The bottom bus bar 26 and it respective lead 40 were contiguous and had a thickness of 2.8 mils (0.07 mm). The bottom bus bar and it associated lead were 0.56 inch (14 mm) wide with the lead extending from the left side portion of the bus bar as shown in FIGS. 1 and 2.

Each of the leads had sufficient length to extend 1 to 1-½ inches (2.54 to 3.81 centimeters) from the edge of the windshield. The copper foil was secured on the surface 34 of the sheet 18 by a pressure sensitive adhesive 43 having a thickness of 1 mil (0.0254 millimeter) and a width similar to the width of its associated copper foil bus bar. The pressure sensitive adhesive 43 extended along the surface portion of the lead 40 extending beyond the windshield 10. The bus bars were generally parallel to one another and spaced apart 36.5 inches (92.7 cm). The pressure sensitive adhesive was of the type sold by 3M Corporation.

A sleeve 42 was positioned around each of the leads 40 to electrically isolate portions of the lead and to protect the lead against mechanical damage. The sleeve included two pieces of a polyamide of the type sold by Dupont Chemical Co. under the trademark KAPTON. Each piece had a thickness of 0.5 mils (0.127 millimeters), a width of 0.8 mils (20 millimeters) and a length of 0.8 mils (20 millimeters). One piece of the polyamide was place around the bottom surface of each lead 40 and held in position by the adhesive layer 43. The other piece of the polyamide was secured to the top surface of each lead by providing a layer 46 of a pressure sensitive adhesive similar to the adhesive of the layer 43. The pieces were pressed together to flow the adhesive around the side surfaces of the lead and to adhere the polyamide together to form the sleeve. A layer 48 of a thermoset adhesive No. 1500B100 (R/FLEX) supplied by Roger Corporation of Connecticut was purchased from Fralock Company of California, was applied to the outer surface of the protective sleeves opposite the sheet 18 as shown in FIGS. 3 and 4. The thermoset adhesive had a thickness of 1 mil and a width and length sufficient to cover the portion of the sleeve to be between the glass sheets.

The interlayer composite 20 was positioned on the shaped sheet 14 with the bus bars in electrical contact with the coating 16. The shaped sheet 12 was placed over the composite 20. A vacuum ring of the type commonly used in the manufacture of laminated windshields was positioned over the periphery of the assembly (the interlayer composite 20 positioned between the sheets blanks 12 and 14 as discussed above), vacuum of about 20–28 inches of mercury was pulled, and the windshield subassembly having the vacuum applied was place in an oven set at 260° F. (126.7° C.) for 15 minutes to heat the subassembly to a temperature of 225° F. (127.2° C.). While the windshield subassembly was in the oven, the vacuum was continuously pulled through the channel to pull air from between the blanks. The heat and vacuum sealed the marginal edges of the windshield subassembly. Thereafter the edge sealed windshield subassembly was placed in an air autoclave and laminated. Since the process of edge sealing and autoclaving process used in the manufacturing of laminated automotive windshields are well known in the art and are not limiting to the invention, the processes are not discussed in detail.

As can be appreciated by those skilled in the art of laminating, the edge sealing of the subassembly and laminating of the edge sealed subassembly is not limiting to the invention. For example, the subassembly may be sealed using nipper rollers or bagging the subassembly, and the edge sealed subassembly may be laminated by oil autoclaving.

As can be appreciated, the outer surface of the windshield may be provided with a photocatalytic coating to keep the surface clean such as the type disclosed in U.S. Pat. No. 6,027,766, or a hydrophobic coating of the type sold by PPG Industries, Inc. under the trademark AQUAPEL and disclosed in U.S. Pat. No. 5,523,162, which patents are hereby incorporated by reference.

As can be appreciated the invention is not limited to the above example which was present for illustration purposes only. The particular embodiments described in detail herein are illustrative only and are not limiting to the scope of the invention, which is to be given the full breadth of the appended claims and any and all equivalents thereof.

What is claimed is:

1. A heatable article comprising:

a substrate having a major surface and peripheral edges;

an electric conductive member on the major surface of the substrate, the electric conductive member defined by a perimeter with portions of the perimeter of the electric conductive member selectively space from the peripheral edges of the substrate to provide a non-conductive strip on each of opposed sides of the conductive member, and a pair of spaced bus bars in electrical contact with the electric conductive member, each of the bus bars having a pair of opposite ends with end portions of each of the bus bars extending beyond the perimeter of the electric conductive member into the adjacent non-conductive strip.

2. A heatable article comprising:

a substrate having a major surface and peripheral edges;

an electric conductive member on the major surface of the substrate, the electric conductive member defined by a perimeter with the perimeter of the electric conductive member spaced from the peripheral edges of the substrate to provide a non-conductive strip extending around the perimeter on the conductive member, and a pair of spaced bus bars in electrical contact with the electric conductive member, each of the bus bars having a pair of opposite ends with each of the ends of each of the bus bars extending beyond the perimeter of the electric conductive member into the non-conductive strip and terminating short of the peripheral edge of the substrate.

3. The heatable substrate according to claim 2 wherein the electric conductive member is a plurality of spaced conductive strips selected from the group consisting of wires, strips of metal foil and strips of conductive films extending between the spaced bus bars.

4. The heatable substrate according to claim 2 wherein the electric conductive member is an electric conductive coating.

5. The heatable substrate according to claim 4 wherein the bus bars have different lengths and the coating is a continuous coating having a top side, a bottom side, a right side and a left side with one of the bus bar extending along the top side and the other one of the bus bars extending along the bottom side and portions of the coating between the bus bars not extending beyond the ends of the longer bus bars.

6. The heatable substrate according to claim 1 wherein the substrate is a sheet of a product selected from the group consisting of residential windows, construction type windows, vehicular windows, windows for refrigerator doors and combinations thereof.

7. The heatable substrate according to claim 1 wherein the conductive member changes transmittance in response to electric stimuli.

8. A heatable automotive transparency comprising:

a glass substrate having a major surface and peripheral edges;

an electric conductive member on the substrate, the electric conductive member having a perimeter spaced from the peripheral edges of the substrate to provide a non-conductive strip on each of opposed sides of the conductive member wherein the perimeter of the conductive member and start of the non-conductive strip defines an interface, and a pair of spaced bus bars in electrical contact with the electric conductive member, each of the bus bars having a pair of opposite ends with the ends of the bus bars aligned with the adjacent interface or extending beyond the perimeter of the electric conductive member into the adjacent non-conductive strip.

9. The heatable automotive transparency according to claim 8 wherein the electric conductive member is an electric conductive coating.

10. A heatable automotive transparency comprising:

a glass substrate having a major surface and peripheral edges;

an electric conductive coating on the substrate, the coating having a perimeter spaced from the peripheral edges of the substrate, and a pair of spaced bus bars in electrical contact with the coating, each of the bus bars having a pair of opposite ends wherein each of the ends of each of the bus bars extends beyond the perimeter of the electric conductive coating and terminates short of the peripheral edge of the substrate.

11. The heatable automotive transparency according to claim 10 wherein the bus bars have different lengths and the coating has a top side, a bottom side, a right side and a left side with one of the bus bar extending along the top side and the other one of the bus bars extending along the bottom side and portions of the coating between the bus bars do not extend beyond the ends of the bus bars.

12. A heatable automotive laminated transparency comprising:

a first glass sheet having a major surface, a first pair of sides spaced from, and opposite to, one another, a second pair of sides spaced from, and opposite, to one another and peripheral edges;

an electrically conductive member on the first sheet, the electric conductive member having a perimeter with portions of the perimeter selectively spaced from the peripheral edges of the first sheet to provide a non-conductive strip between the conductive member and the first pair of sides of the first sheet, a pair of spaced bus bars in electrical contact with the electric conductive member, each of the bus bars having a pair of opposite ends with at least one of the ends of one of the bus bars extending beyond the perimeter of the electric conductive member into the adjacent non-conductive strip and terminating short of the peripheral edge of the first sheet;

a first conductive lead having one end connected to one of the bus bars and the opposite end of the first lead extending beyond the side of one of the sides of the second pair of sides of the first sheet and a second conductive lead having one end connected to the other one of the bus bars and the opposite end of the second lead extending beyond the side of the other one of the sides of the second pair of sides of the first sheet, the first and second leads providing external electrical access to the bus bars;

a second glass sheet over the electric conductive member and the bus bars, and a plastic sheet between the first and second glass sheets and adhered to potions of the first and second glass sheets to provide the heatable automotive transparency.

13. The heatable automotive laminated transparency according to claim 12 wherein the electrically conductive member is a plurality of spaced conductive strips selected from the group consisting of wires, strips of metal foil and strips of conductive films extending between the spaced bus bars.

14. A heatable automotive laminated transparency comprising:

a first glass sheet having a major surface and peripheral edges;

an electrically conductive member on the first sheet, the electric conductive member having a perimeter with the perimeter selectively spaced from the peripheral edges of the first sheet to provide a non-conductive strip, wherein the non-conductive strip extends around the perimeter of the conductive member;

a pair of spaced bus bars in electrical contact with the electric conductive member, each of the bus bars having a pair of opposite ends with each of the ends of each of the bus bars extending beyond the perimeter of the electrically conductive member into the non-conductive strip and terminating short of the peripheral edge of the first glass sheet;

a second glass sheet over the electric conductive member and the bus bars, and a plastic sheet between the first and second glass sheets and adhered to potions of the first and second glass sheets to provide the heatable automotive transparency.

15. The heatable automotive laminated transparency according to claim 14 wherein the electric conductive member is an electric conductive coating.

16. The heatable automotive laminated transparency according to claim 15 wherein the bus bars are of different lengths and the coating has a top side, a bottom side, a right side and a left side with one of the bus bar extending along the top side and the other one of the bus bars extending along the bottom side and portions of the coating between the bus bars not extending beyond the ends of the longer bus bar.

17. The heatable automotive laminated transparency according to claim 15 further including a pair of electrically conductive leads with one end of one lead defined as a first lead in contact with one of the bus bars and the other end of the first lead extending beyond the perimeter of the first glass sheet to provide external electric access to the one bus bar and with one end of the other lead defined as a second lead in contact with the other one of the bus bars and the other end of the second lead extending beyond the perimeter of the first glass sheet to provide external electrical access to the other bus bar.

18. The heatable automotive laminated transparency according to claim 15 wherein each of the bus bars is fired on metal ceramic paste.

19. The heatable automotive laminated transparency according to claim 15 wherein each of the bus bars is a metal foil.

20. The heatable automotive laminated transparency according to claim 17 wherein the bus bars are contiguous with their respective lead and are made of a metal foil.

21. The heatable automotive laminated transparency according to claim 20 wherein thickness of the bus bar and its respective lead is substantially uniform along their length.

22. The heatable automotive laminated transparency according to claim 21 wherein the metal foil is a copper foil.

23. The heatable automotive laminated transparency according to claim 22 wherein the transparency is a heatable automotive laminated windshield.

24. The heatable automotive laminated transparency according to claim 22 wherein the transparency is a heatable automotive laminated side window.

25. The heatable automotive laminated transparency according to claim 22 wherein the transparency is a heatable automotive laminated rear window.

26. The heatable automotive laminated transparency according to claim 22 wherein the transparency is a heatable laminated automotive roof window.

27. The heatable automotive laminated transparency according to claim 20 wherein the bus bars have different lengths and the coating has a top side, a bottom side, a right side and a left side with one of the bus bar extending along the top side and the other one of the bus bars extending along the bottom side and portions of the coating between the bus bars not extending beyond the ends of the longer bus bar.

28. The heatable automotive laminated transparency according to claim 27 wherein the transparency is a heatable laminated windshield having a vision area having a top edge and a bottom edge and the coating having a top edge adjacent the top edge of the vision area and a bottom edge adjacent the bottom edge of the vision area with one of the bus bars adjacent the top edge of the coating and the other bus bar adjacent the bottom edge of the coating wherein the bottom edge of the coating spaced a greater distance from the bottom edge of the vision area than the bus bar adjacent the bottom edge of the coating and the top edge of the coating spaced a greater distance from the top edge of the vision area than the bus bar adjacent the top edge of the coating.

29. A method of making a heatable article comprising the steps of;

providing a sheet;

applying an electric conductive member on the sheet, the member having a perimeter with the perimeter of the member spaced from periphery of the sheet to provide a non-conductive strip on each of opposed sides of the conductive member, and applying a pair of spaced bus bars on the conductive member with ends of each of the bus bars extending into the adjacent non-conductive strip.

30. The method according to claim 29 wherein the article is an automotive transparency, the sheet is a first glass sheet and the conductive member is a conductive coating and further including the steps of:

providing each of the bus bars with a lead that extends beyond the periphery of the first sheet;

positioning a plastic sheet over the conductive coating and the bus bars;

positioning a second glass sheet over the plastic sheet, and laminating the first and second glass sheets together.

31. The heatable automotive transparency according to claim 8 wherein each of the bus bars extends beyond the perimeter of the electric conductive member into the adjacent non-conductive strip.

32. The heatable automotive laminated transparency according to claim 12 wherein at least one end of at least one of the bus bars extends onto the adjacent non-conductive strip.

33. The heatable automotive laminated transparency according to claim 32 wherein each of the ends of each of the bus bars extends onto the adjacent non-conductive strip.

* * * * *